Aug. 18, 1959

W. R. CONKLIN ET AL 2,900,045

MOVABLE HOT MEAL ASSEMBLY TABLE

Filed March 10, 1958

INVENTORS
WILLIAM R. CONKLIN
BY BLAIR E. STENTZ

Owen & Owen

ATTORNEYS

Aug. 18, 1959

W. R. CONKLIN ET AL 2,900,045

MOVABLE HOT MEAL ASSEMBLY TABLE

Filed March 10, 1958

INVENTORS
WILLIAM R. CONKLIN
BY BLAIR E. STENTZ

Owen & Owen
ATTORNEYS

United States Patent Office 2,900,045
Patented Aug. 18, 1959

2,900,045

MOVABLE HOT MEAL ASSEMBLY TABLE

William R. Conklin and Blair E. Stentz, Murfreesboro, Tenn., assignors to The Swartzbaugh Manufacturing Company, Murfreesboro, Tenn., a corporation of Ohio Application March 10, 1958, Serial No. 720,167

5 Claims. (Cl. 186—1)

This invention relates to a movable hot meal assembly table which is particularly designed for the assembly of hot meals in locations remote from a central kitchen.

In many large institutions, such as hospitals, it is necessary to distribute food through areas which are remote from the central food preparing kitchen. It has been customary to make up plates of food in the central kitchen and to transport the individual plates of food on trays, sometimes in heated carts or containers, to the patients' rooms. This general system of distribution has a serious drawback. In large establishments it may be as long as thirty to forty minutes or more between the time when the individual plates of food are placed upon the trays and the plate is delivered to the patient. Even through the plate is kept in a hot container, the outer portions of many foods become chilled and the entire plate is much less appetizing than it would be if the food had been freshly placed upon it.

It is an object of the instant invention to provide a movable hot meal assembly table in which food in bulk can be transported to distribution centers, for example to a wing of a single floor of a hospital, and at that location be assembled in individual meals for almost immediate delivery to the particular patient in that location.

It is another object of this invention to provide a hot meal assembly table which can be loaded with bulk quantities of hot foods, transported to an area for meal distribution, and, with utensils and service plates also brought to that area, be quickly assembled into meals for immediate delivery.

It is yet another object of this invention to provide a movable hot meal assembly table having provision for the transportation of bulk quantities of hot foods and provided with mechanisms facilitating the assembly of individual meals.

Other and more specific objects and advantages of the invention will be better understood from the specification which follows and from the drawings, in which.

Figure 1:
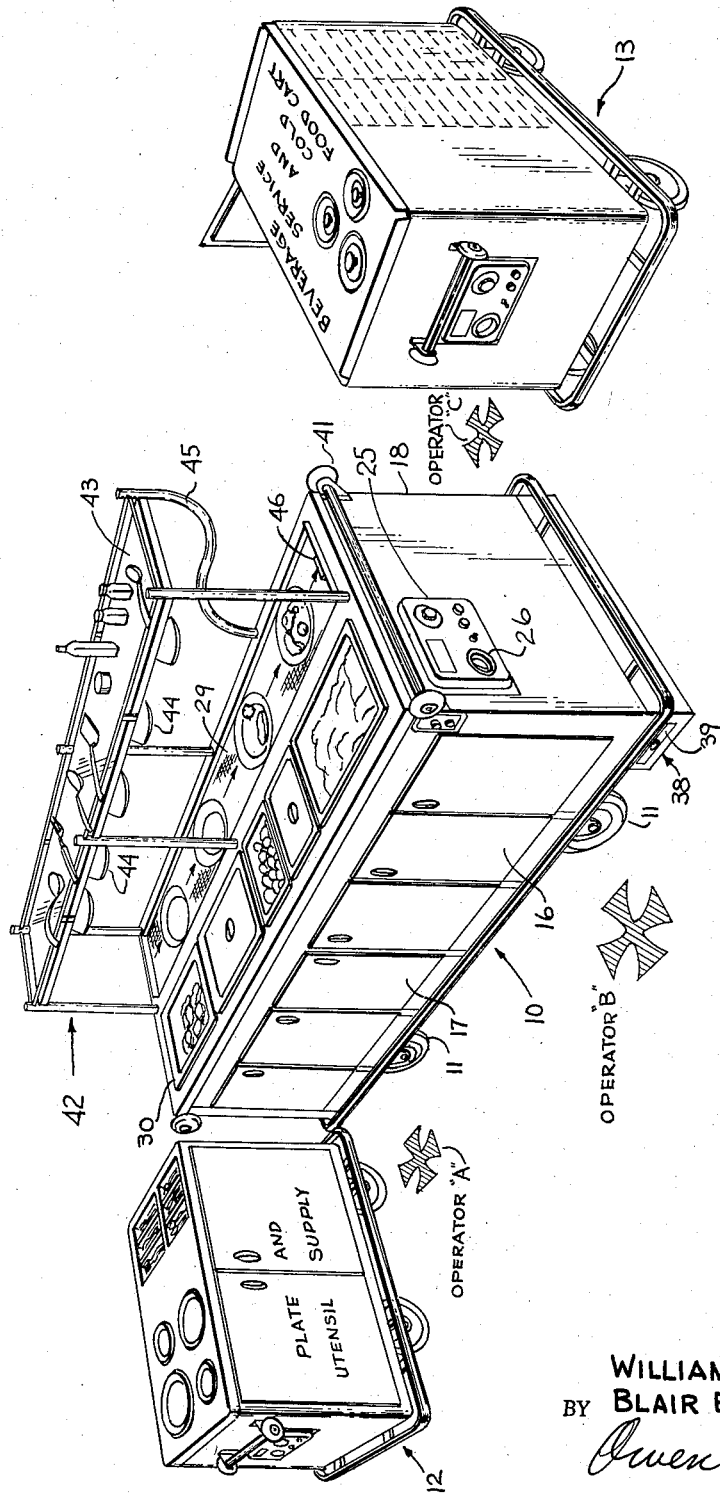
Fig. 1 is a perspective view showing a hot meal assembly table embodying the invention arranged with other auxiliary equipment at a meal distribution point.

A hot meal assembly table embodying the invention is generally indicated in the drawings by the reference number 10. The table 10 is provided with wheels 11 so that it can be rolled from floor to floor and into and out of elevators and from one meal distribution position to another on the same floor. The hot meal assembly table 10 is utilized in combination with an equipment cart generally indicated at 12 in Figure 1, which is utilized to transport a supply of utensils and service plates and with a beverage and cold food distribution cart generally indicated at 13, which carries these components of meals to the meal distribution centers. The beverage and cold food cart 13 is more fully described in Conklin and Stentz application Serial No. 559,583, now Patent No. 2,845,780, and its details will not, therefore, be described in this specification.

The hot meal assembly table 10 (see also Fig. 2) has a pair of main heated compartments 14 and 15 which are provided with a number of individual doors 16 and 17 and which occupy the entire interior of a main body 18 of the table 10. Each of the compartments 14 and 15 in the embodiment of the invention shown includes three series of vertically spaced pan racks, for example the racks indicated at 19, for the reception of the edges of bulk food pans 20. The bulk food pans 20 are of standard width and modular lengths so that they all can be carried in the racks 19 regardless of their particular size. For example, with all of the pans 20 having the same width, their lengths may vary in multiples of one, two or three. The main body 18, and thus the length of the guides 19, is equal to the maximum length of any individual food pan 10 and also, therefore, to various arrangements of one, two or three of the shorter ones of the food pans 20. The food pans 20 are filled with bulk foods of the type to be assembled into individual meals at the central food preparation kitchen and are stored in the heated compartments 14 and 15 on the racks 19 for transportation to the several meal preparation centers.

The main body 18 of the cart 10 has a flat table-like top 21 which is generally divided into two areas. At the back of the top 21 there is located a longitudinally extending well, generally indicated at 22, of a width suitable for the reception of the standard food pans and of a length equal to a multiplication of the length of several of the food pans, for example two or four of the largest sizes. The individual food pans 20 may be removed from the racks 19 and positioned in the well 22 and the actual service of portions of food from the pans 20 made from those pans in the well 22 onto food service plates.

The interiors of the compartments 14 and 15 are heated by means of, for example, electrical heating elements 23 and 24 which are illustrated in the drawings as being of the "Calrod" type. The individual heating elements 23 and 24 of the compartments 14 and 15 may be energized in any desired series to maintain heat in their respective compartments under the control of suitable thermostats and switches located in a control panel 25 on one end of the body 18. A receptacle 26 in the control panel 25 is provided for connecting the table 10 to the electrical outlet at the meal distribution center.

Figure 3:
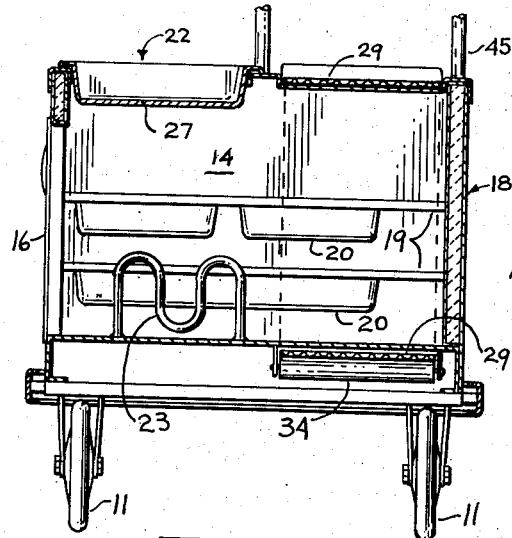
Fig. 3 is a vertical, sectional view taken along the line 3—3 of Fig. 2.
Figure 4:
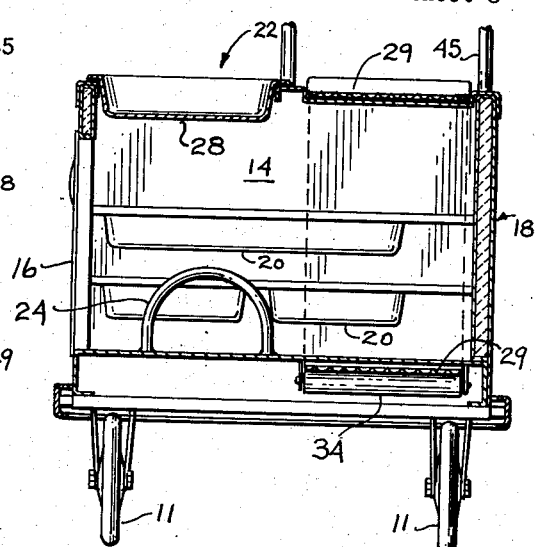
Fig. 4 is a vertical, sectional view taken along the line 4—4 of Fig. 2.

The compartments 14 and 15 are suitably insulated (see Figs. 3 and 4 for example) in order to prevent excessive heat loss from the compartments both during travel and during meal assembly. Heat within the compartments 14 and 15 is also applied to the exposed under sides of the food pans 20, for example those pans indicated by the reference numbers 27 and 28 in Figs. 3 and 4, which are in the well 22 at any particular time.

Figure 2:
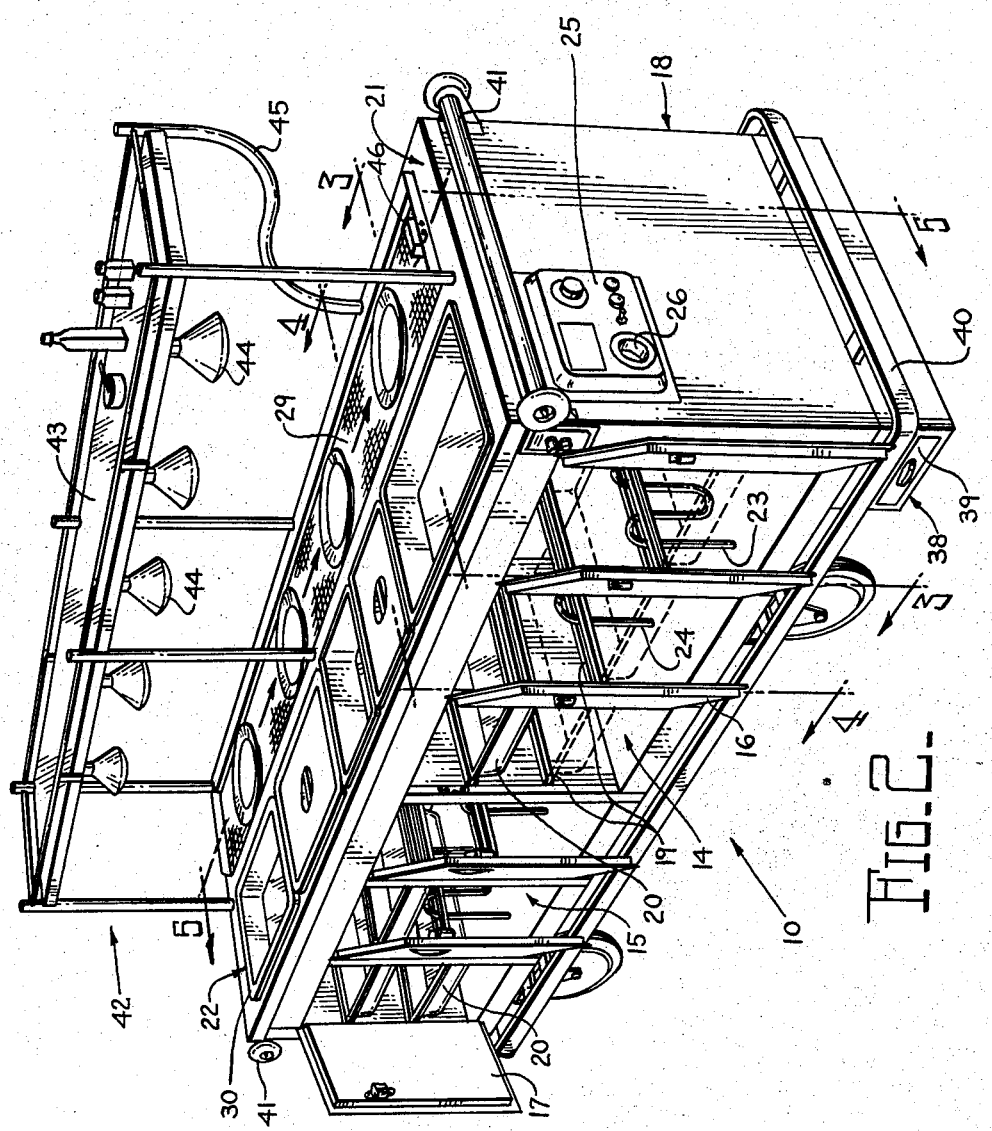
Fig. 2 is a perspective view, on an enlarged scale, of a hot meal assembly table embodying the invention.
Figure 5:
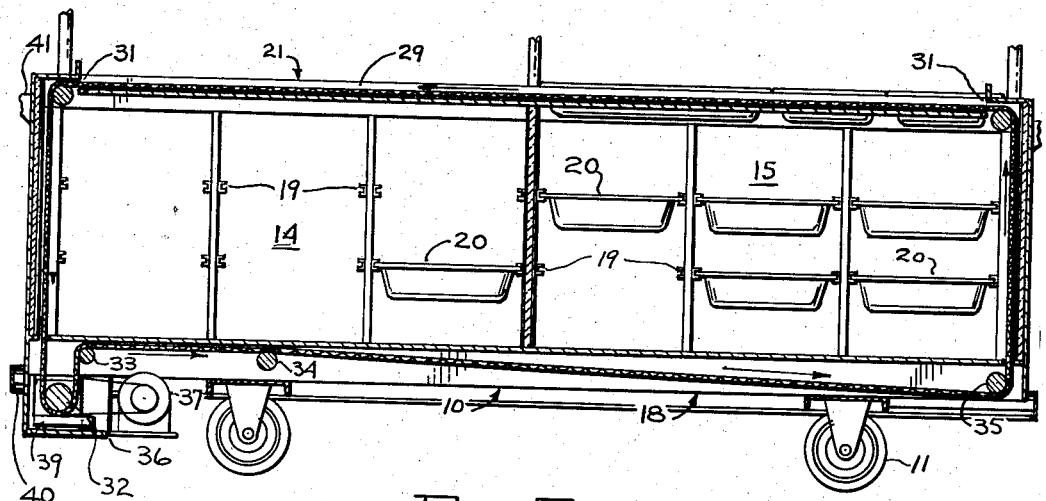
Fig. 5 is a longitudinal, vertical sectional view taken along the line 5—5 of Fig. 2.

The back half of the table top 21 is occupied by a horizontal, movable conveyor belt 29 which moves longitudinally along the cart 10 as indicated by the arrows in Figs. 1 and 2. An operator standing in the position designated by the x denominated operator A in Fig. 1 takes suitable plates and utensils from the supply cart 12 and places the food service plate on the end of the conveyor 29 (the left end Figs. 1 and 2; right end Fig. 5). The operator A may also place a first individual portion of food, for example taken from the first food pan indicated by the reference number 30 in Figs. 1 and 2, on each of the plates as the plates are placed upon the conveyor 29. Each of the plates is moved along by the conveyor 29 past the several food pans 20 in the well 22. The operator A or a second operator B places individual portions of the several foods on each of the plates as it moves along the conveyor 29. A third operator standing in the position indicated by the x denominated operator C, for example, lifts the individually filled plates off of the end of the conveyor 29 and transfers them into individual delivery trays in the beverage service and cold food cart 13, the cold foods in each individual meal having been placed in their respective trays and containers at the central food preparation kitchen before the cart 13 is carried upwardly into the individual meal distribution point. An attendant may then wheel the cart 13 with the cold foods and beverages and the individually assembled hot food plates to the respective rooms of the patients to be served.

The conveyor 29 is driven by a plurality of rollers which are located at the ends of the top 21 and bottom of the main body 18 of the cart 10, so that the conveyor runs around the exterior of the body 18 and the interior of the body 18 is left open and unobstructed for the transportation and storage of individual food pans 20. This construction is most readily apparent in Figs. 3, 4 and 5. The conveyor 29 is carried by two top rollers 31 each of which is rotatably mounted in bearings and extends transversely across the body 18 just below the level of its top 21. The conveyor 29 also extends around a drive roller 32 and return rollers 33, 34 and 35 located beneath the bottom of the compartments 14 and 15 and thence upwardly at the other end of the body 18 and back across the top 21. The drive roller 32 is driven by a belt 36 engaged with a drive motor 37 carried beneath the body 18. The drive roller 32, belt 36 and motor 37 are carried in a drive compartment 38 (Figs. 1 and 2). The motor 37 is under the control of a motor switch located in the control panel 25.

A crumb tray 39 (Figs. 2 and 5) is removably inserted into the drive housing 38 beneath the downwardly extending span of the conveyor 29 at that end of the body 18, so that crumbs of food inadvertently spilled on the container 29 when assembled or lifting meals therefrom will drop off the conveyor 29 and be collected in the tray 39. The table 10 may be provided with suitable bumpers 40 and handles 41 to facilitate its movement from position to position and to prevent damage to equipment and walls within the building.

In order to maintain the individual meals being assembled as explained above in edible condition as long as possible, the cart embodiment of the invention may be provided with a superstructure, generally indicated at 42 in Figs. 1 and 2, which serves both to transport utensils, condiments, etc., on a tray 43 carried by the superstructure 42 and also supports a plurality of heat lamps 44 whose heat rays are directed downwardly onto the area of the table 21 occupied by the conveyor 29 and thus onto individual meals being assembled as they move along the conveyor 29. The superstructure 42 preferably should have a swept back "off" corner post 45 at the delivery side of the conveyor 29 in order to facilitate removal of individual meals from the conveyor 29 by the operator C.

A limit switch generally indicated at 46 is mounted at the delivery end of the conveyor 29 in line to have its trip lever engaged by any plate being carried along on the conveyor 29. The limit switch 46 is in circuit with the conveyor drive motor 37 being normally in an "on" position and being actuated to stop the motor 37 only in the event that a plate is allowed to reach the end of the conveyor 29.

We claim:

1. A movable hot meal assembly table comprising, in combination, a main body that is readily movable between feeding stations, said body having insulated walls, heating means in the interior of said body, racks in said body for carrying modular size bulk food pans, said body having a length greater than its width and a generally flat top, an elongated opening in said top extending along one side of said body for receiving a group of such food pans therein in combinations of modular sizes, a conveyor having a flat span extending along the other side of said top adjacent and parallel to the extent of said opening and the group of bulk food pans therein, means in said body for mounting said conveyor drive means for said conveyor, and a superstructure extending along above the span of said conveyor and mounting heating means for applying heat to the foods on service plates on said conveyor.

2. A hot food assembly table according to claim 1 and a shelf carried by said superstructure for utensils, condiments and other auxiliary supplies and equipment.

3. A hot food assembly table according to claim 1 in which the means for mounting said conveyor includes rollers located at the ends of the top and bottom of said body whereby said conveyor runs around said body and the interior of said body is open for carrying of food pans.

4. A hot food assembly table according to claim 1 in which said conveyor runs along the top of said body, down one end, across beneath said body and up the other end and the drive mechanism includes a drive roller mounted beneath and exterior of said body.

5. A hot food assembly table according to claim 4 and a crumb tray mounted beneath the downwardly travelling portion of said conveyor at one end of said body.

References Cited in the file of this patent

UNITED STATES PATENTS

| | | |
|---|---|---|
| 1,624,267 | Lyndon et al. | Apr. 12, 1927 |
| 1,648,531 | Bayley | Nov. 8, 1927 |
| 2,723,728 | Crawford | Nov. 15, 1955 |